United States Patent [19]

Scherzer et al.

[11] 3,925,195
[45] Dec. 9, 1975

[54] HYDROCARBON CRACKING PROCESS USING ZEOLITE MIXTURES

[75] Inventors: Julius Scherzer, Columbia; Edwin Wolf Albers, Annapolis, both of Md.

[73] Assignee: W. R. Grace & Co., New York, N.Y.

[22] Filed: Nov. 15, 1973

[21] Appl. No.: 416,130

Related U.S. Application Data

[63] Continuation-in-part of Ser. No. 267,907, June 30, 1972, abandoned.

[52] U.S. Cl. ........... 208/120; 208/DIG. 2; 208/135; 252/453; 252/455 Z; 252/477 R
[51] Int. Cl.² .................. C10G 11/04; B01J 29/08; B01J 29/18
[58] Field of Search ........................... 208/120, 135

[56] References Cited
UNITED STATES PATENTS

| | | | |
|---|---|---|---|
| 3,533,939 | 10/1970 | Coonradt et al. | 208/135 |
| 3,640,905 | 2/1972 | Wilson | 252/455 Z |
| 3,676,368 | 7/1972 | Scherzer | 252/455 Z |
| 3,686,121 | 7/1972 | Kimberlin et al. | 252/455 Z |
| 3,758,403 | 9/1973 | Rosinski et al. | 208/120 |
| 3,764,520 | 10/1973 | Kimberlin et al. | 208/111 |
| 3,769,202 | 10/1973 | Plank et al. | 208/111 |
| 3,804,747 | 4/1974 | Kimberlin et al. | 208/120 |
| 3,816,342 | 6/1974 | Plank et al. | 252/455 Z |
| 3,830,724 | 8/1974 | Schutt | 208/111 |

*Primary Examiner*—Delbert E. Gantz
*Assistant Examiner*—G. E. Schmitkons
*Attorney, Agent, or Firm*—Joseph P. Nigon, Esq.

[57] ABSTRACT

A mixture of rare earth hydrogen Y type zeolite, and hydrogen or transition metal exchanged mordenite, calcium exchanged type A zeolite, or hydrogen exchanged erionite is used as a catalyst for the conversion of hydrocarbons. The rare earth hydrogen Y, and exchanged mordenite, type A zeolites, or hydrogen exchanged erionite may be advantageously combined with amorphous matrix components such as silica, alumina, silica-alumina hydrogel and/or clay to form cracking catalyst compositions of the fluid or moving bed type which are particularly active for the production of $C_3$ and $C_4$ hydrocarbons, and/or which show improved coke selectivity.

5 Claims, No Drawings

HYDROCARBON CRACKING PROCESS USING ZEOLITE MIXTURES

This application is a continuation-in-part of application Ser. No. 267,907, filed June 30, 1972 and now abandoned.

This invention relates to the preparation of hydrocarbon conversion catalysts, and more particularly to the preparation of highly active zeolite type catalysts which are capable of converting petroleum hydrocarbons such as gas oil, boiling in the 550°–950°F range, to lower molecular weight derivatives such as gasoline.

For many years cation exchanged zeolites, particularly those of the rare earth exchanged type X or Y zeolite, i.e., synthetic faujasite, have been found to be particularly useful in the converting of petroleum feedstocks such as gas oil into lower molecular weight derivatives such as gasoline.

Prior art catalysts, while possessing a high degree of activity and desired selectivity when compared to the previously available amorphous type hydrogel catalysts, are found to be relatively limited in terms of producing desirable products other than gasoline. Substantial attempts have been made to alter the characteristics of rare earth exchanged faujasites so as to produce a product stream which is higher in deisrable end products such as olefins and/or gasolines high in aromatic content. However, it is found frequently that modifications of faujasites by the exchange with additional metals other than rare earths has frequently led to the preparations of catalysts which tend to produce undesirable products such as dry gas and coke.

It is therefore an object of the present invention to provide improved zeolite catalyst composition for the conversion of hydrocarbons.

It is a further object to provide a highly active low coke producing cracking catalyst which is capable of producing substantial yields of gasoline and $C_3$ - $C_4$ hydrocarbon from high molecular weight petroleum feedstocks.

It is still another object of the present invention to provide a highly active stable, commercial cracking catalyst composition which may be prepared at reasonable cost from readily available raw materials.

These and still further objects of the present invention will become readily apparent from the detailed description and specific examples.

Broadly, our invention involves cracking a hydrocarbon feedstock using a catalyst composition which comprises a mixture of rare earth hydrogen exchanged type Y zeolite (RE-H-Y), and a metal or hydrogen exchanged mordenite (H or M-Mord.), or calcium exchanged type A zeolite (CaA) or hydrogen erionite (H-Er.).

More specifically, we have found that an extremely useful hydrocarbon conversion catalyst composition may be obtained if rare earth hydrogen Y zeolite is combined with from about 5 to 40% by weight of one of the following:

1. A transition metal or hydrogen exchanged mordenite which possesses the general formula M-Mord., where M is selected from the group consisting of hydrogen and metals such as rare earth, cobalt, nickel, group II cations, and other di- and trivalent transition metals and Mord. represents the negatively charged mordenite.

2. A Calcium exchanged type A zeolite.

3. A hydrogen exchanged erionite.

In a particularly preferred embodiment of the present invention, the combination of rare earth hydrogen Y and exchanged mordenite or type A zeolite or erionite is combined with an inorganic oxide matrix such as silica, alumina, silica-alumina hydrogel and/or clay. Such compositions may be readily formed into microspheroidal products so as to provide the so-called fluid cracking catalysts, or alternatively the composition may be formed into relatively large sized beads so as to provide the so-called moving bed type catalysts.

The rare earth hydrogen Y type zeolite used in the practice of the present invention is described in U.S. Pat. No. 3,676,368 of Scherzer et al. and incorporated herein by response. Briefly, the rare earth hydrogen Y zeolite comprises faujasitic zeolite having a silica-alumina ratio of about 3 to 6 which has been rare earth exchanged in a particular manner to produce a zeolite which contains on the order of 6 to 14% by weight rare earth ions measured as rare earth oxides, and less than 0.5% by weight alkali metal ions measured as alkali metal oxides. The rare earth hydrogen Y zeolite is prepared by first exchanging an alkali metal Y zeolite, usually sodium Y zeolite having a silica-alumina ratio on the order of 3 to 6 with a solution of rare earth ions at a pH of from about 3.0 to 3.5 to reduce the alkali metal oxide content to a level of less than about 4% by weight. Subsequently, the exchanged zeolite is calcined at a temperature of 800° to 1400°F for a period of about 1 to 3 hours. Finally the product is ammonium ion exchanged to further reduce the alkali metal content to less than about 0.5% by weight.

The metal exchanged mordenite used in the practice of the present invention is obtained by reacting sodium mordenite which possesses a silica to alumina ratio on the order of 10 to 12 and an alkali metal content on the order of about 7% $Na_2O$ with a solution of metal cations. Mordenite used in the practice of the present invention is readily available from commercial sources such as the Norton Co. which sells mordenite under the commercial name of Zeolon.

The exchange of the mordenite is conducted in conventional manner using aqueous solutions of the desired metal cations. The exchange is conducted in a manner whereby the alkali metal content in the mordenite is reduced to a level of less than about 0.1% by weight. It is generally found that the mordenite particularly useful for the practice of the present invention will contain on the order of from about 1 to 6% by weight metal oxide selected from the group consisting of rare earth cobalt, nickel, group II cations.

The calcium exchanged type A zeolite is obtained by exchanging type A zeolite with calcium salts as set forth in U.S. Pat. No. 2,882,243 to Milton. The resultant CaA will contain about 18% Ca oxide as calcium ions.

H-erionite is obtained from natural erionite by acid treatment at boiling temperature.

To prepare the catalysts contemplated herein, the rare earth hydrogen Y type zeolite component and the amordenite can vary from about 9:1 to 1:1 parts by weight H or M-Mord. Similarly, 1 part CaA, or H-Er. is mixed with 1 to 9 parts by weight rare earth hydrogen Y zeolite. The precise ratio of exchanged type Y zeolite to exchanged mordenite will depend upon the properties which are desired in the final catalyst composition. For example, it is found that if hydrogen mordenite is admixed with the rare earth hydrogen Y zeolite, a hydrocarbon cracking catalyst is obtained which is particularly effective for the production of low coke. On the other hand, if a relatively small amount of the metal exchanged mordenite such as rare earth exchanged mordenite is combined with the exchanged type Y zeolite, catalysts are obtained which are particularly effective for the production of $C_3$ and $C_4$ hydrocarbons.

When commercial catalysts are prepared using the unique combination of exchanged type Y zeolite and mordenite or CaA or H-erionite contemplated herein, the zeolites are generally formed into catalyst particles which are microspheroidal, that is particles having a size from about 50 to 300 microns which are particularly useful in the fluid catalytic cracking of hydrocarbons. It is also contemplated that the presently contemplated combination of zeolites may be formed into particles which possess sizes on the order of up to ⅛ inch particles which are particularly useful in the moving bed catalytic reacting of hydrocarbons.

The combination of zeolites may be formed into catalysts using a minimum or substantially no binders so as to provide a catalyst which comprises essentially 100% zeolite Alternatively, 5 to 50% by weight of the combination of zeolites may be combined with from about 50 to 95% by weight of inorganic oxide matrix. Typical inorganic oxide matrixes include silica, alumina, silica-alumina hydrogels. It is also contemplated that the matrix may comprise or contain clay such as kaolin and chemical or thermally modified kaolin.

The catalysts prepared by way of the present invention are found to possess excellent stability for elevated temperatures and steam. Furthermore, it is found that the activity and selectivity characteristics of the catalysts are exceptionally good for the production of gasoline and other valuable petroleum derivatives.

The cracking is carried out at a temperature of 700°–1200°F, a catalyst to oil ratio of 0.5 to 30 and a contact time of 0.5 seconds to 10 minutes. The preferred operating conditions are a temperature of 800°–1050°F a catalyst to oil ratio of 3–8 and a contact time of 10 seconds to 5 minutes.

Having described the basic aspects of the present invention, the following examples are given to illustrate specific embodiments thereof.

EXAMPLE 1

A. A sample of RE-H-Y was prepared as follows:

1280 ml. of commercial rare earth chloride solution, containing 60 wt.% $RECl_3.6H_2O$, was diluted with 6400 ml. of deionized (D.I.) water to form component A. Separately, 3200 g (dry basis) of NaY zeolite, containing 30% $H_2O$, was blended into 9760 ml. of D.I. water to form component B. The two components were mixed together with the pH of the resulting slurry was adjusted to 3.5 with HCl. The acidified slurry was heated for 45 minutes at 90°C, then filtered and washed with 8000 ml. of water acidified with 160 ml. of 5 N HCl. The filter cake was then washed chloride free with D.I. water, dried at 105°C for 2 hours, and calcined at 540°C for 2 hours in a muffle furnace. The calcined material, which contained about 5% $Na_2O$, was ammonium exchanged with a 10% ammonium sulfate solution, until the sodium level dropped to about 0.2%. The material was washed sulfate free with D.I. water and dried at 105°C. Analytical data (calculated on a dry basis): 13.5% $RE_2O_3$, 0.2% $Na_2O$, Surface Area=798 $m^2/g$.

B. Samples of hydrogen and metal exchanged mordenite were obtained as follows:

1. H-Mordenite used below was a commercial product from the Norton Co. identified as Zeolon H. The Zeolon H had a silica-alumina ratio of 12 and a surface area of 520 $m^2/g$.

2. Rare earth, hydrogen mordenite (RE-H-Mord.) was prepared from Na-mordenite, also a Norton product. The preparation was done by the following procedure: 50 g (dry basis) of sodium mordenite was blended with 200 ml. of D.I. water. 20 ml. of a commercial rare earth chloride solution, containing about 60% rare earth chloride crystals, was diluted with 180 ml. of water. The mordenite was mixed into the rare earth chloride solution, and the resulting slurry was refluxed at boiling for 1 hour. The material was then filtered, washed chloride free, dried at 110°C for 2 hours, and then calcined at 540°C for 3 hours in a muffle furnace. This material was then ammonium exchanged with a 10% ammonium sulfate solution, until the remaining sodium ions were removed. The product contained 5.2% rare earth oxide and had a surface area of 430 $m^2/g$.

3. Cobalt, hydrogen mordenite (Co-H-Mord.) was prepared by cobalt exchanging an ammonium-mordenite zeolite. Ammonium-mordenite was obtained by ammonium exchanging commercial Na-mordenite with a 10% ammonium sulfate solution. To prepare Co-H-Mord., 25 g dry basis of ammonium mordenite was blended into 100 ml. of water. This zeolite slurry was mixed with a solution containing 10 g $CoCl_2.6H_2O$ dissolved in 100 ml. of water. The mixture was refluxed under boiling for 1 hour, filtered, washed chloride free and dried at 110°C for 2 hours. The final product contained 2.7% CoO (on a dry basis) and had a surface area of 445 $m^2/g$.

C. Samples of catalysts were prepared by combining various quantities of the RE-H-Y and metal or H-mordenites prepared in A and B above. The catalysts were prepared by blending 10% by weight (silica-alumina basis) zeolite or zeolite blend with 90% by weight amorphous silica-alumina-clay matrix. The matrix comprised 60% amorphous silica-alumina hydrogel (which contained 25% $Al_2O_3$ and 75% Silica) and 40% kaolin clay.

The microactivity data was obtained using a reaction temperature of 900°F., a 16 weight hourly space velocity (WHSV), and West Texas Devonian gas oil feedstock after steam treating the samples at 1350°F. for 8 hours at 15 psig steam. Comparison samples were prepared using a typical prior art calcined rare earth exchange type Y faujasite (CREY) such as is setforth in U.S. Pat. No. 3,402,996 to Maher, et al.

The characteristics and test data developed for these catalysts is summarized in the tables below (I and II).

Table 1

| Sample Type | Analytical Microactivity Data for RE-H-Y and H-mordenite Mixtures | | | | |
| --- | --- | --- | --- | --- | --- |
| | RE-H-Y/H-mord. | RE-H-Y/H-mord. | RE-H-Y | H-mord. | CREY |
| Sample No. | 1 | 2 | 3 | 4 | 5 |
| RE-H-Y/H-Mord. mole ratio | 9:1 | 8:2 | — | — | — |
| Conversion, V% | 71 | 68 | 69 | 27 | 70 |

Table I-continued

| Sample Type | Analytical Microactivity Data for RE-H-Y and H-mordenite Mixtures | | | | |
|---|---|---|---|---|---|
| | RE-H-Y/H-mord. | RE-H-Y/H-mord. | RE-H-Y | H-mord. | CREY |
| $H_2$, W% | 0.04 | 0.05 | 0.05 | 0.04 | 0.03 |
| $C_3^-$, V% | 7.5 | 7.3 | 6.5 | 4.0 | 5.3 |
| $C_3$ tot., V% | 9.6 | 9.1 | 7.7 | 4.4 | 6.5 |
| $C_4^-$, V% | 5.6 | 4.3 | 4.4 | 4.7 | 3.3 |
| i-$C_4$, V% | 9.3 | 8.5 | 7.1 | 2.7 | 6.1 |
| $C_4$ tot., V% | 16.6 | 14.2 | 12.7 | 7.9 | 10.5 |
| $C_5^+$ gaso., V% | 56.3 | 54.7 | 56.8 | 20.5 | 58.9 |
| $C_4^+$ gaso., V% | 72.9 | 69.0 | 69.5 | 28.3 | 69.5 |
| C on cat., W% | 0.3 | 0.3 | 0.4 | 0.1 | 0.4 |
| C on feed, W% | 1.6 | 1.9 | 2.4 | 0.8 | 2.5 |
| $C_5^+$ gaso./conv., V/V | 0.79 | 0.81 | 0.82 | 0.75 | 0.85 |
| $C_5+$ gaso./coke, V/W | 36.0 | 28.9 | 23.5 | 24.7 | 23.1 |
| Conv./coke, V/W | 45.4 | 35.8 | 28.7 | 32.8 | 27.1 |

TABLE II

| | MICROACTIVITY DATA FOR RE-H-Y/M-MORDENITE MIXTURES (M = RE, Co) | | | | |
|---|---|---|---|---|---|
| Sample Type | RE-H-Y/ RE-mord. | RE-H-Y/ RE-mord. | RE-H-Y/ Co-mord. | Co-mord. | RE-H-Y |
| Sample Number | 6 | 7 | 8 | 9 | 3 |
| RE-H-Y/mord. Mole Ratio | 9:1 | 4:1 | 9:1 | — | — |
| Conversion, V% | 69 | 64 | 68 | 25 | 69 |
| $H_2$, W% | 0.03 | 0.03 | 0.01 | 0.04 | 0.05 |
| $C_3^-$, V% | 6.4 | 5.9 | 6.5 | 3.0 | 6.5 |
| $C_3$ tot., V% | 7.7 | 7.0 | 7.7 | 3.4 | 7.7 |
| $C_4^-$, V% | 4.3 | 4.3 | 5.3 | 4.1 | 4.4 |
| i-$C_4$, V% | 6.9 | 6.0 | 7.0 | 1.9 | 7.1 |
| $C_4$ tot., V% | 12.3 | 11.3 | 13.4 | 6.4 | 12.7 |
| $C_5^+$ gaso., V% | 58.5 | 55.5 | 55.0 | 19.5 | 56.8 |
| $C_4^+$ gaso., V% | 70.8 | 66.8 | 68.4 | 25.9 | 69.5 |
| C on cat., W% | 0.3 | 0.2 | 0.3 | 0.1 | 0.4 |
| C on feed, W% | 1.8 | 1.4 | 1.7 | 0.7 | 2.4 |
| $C_5^+$ Gaso./conv., V/W | 0.84 | 0.86 | 0.76 | 0.77 | 0.82 |
| $C_5^+$ Gaso./coke, V/W | 32.0 | 40.1 | 32.4 | 26.4 | 23.5 |
| Conv./coke, V/W | 37.9 | 46.5 | 42.5 | 34.1 | 28.7 |

From the above data it is seen that some of the catalysts of the present invention (Samples 1 and 2) are particularly active for the production of $C_3$ and $C_4$ hydrocarbons (both saturated and olefinic). Furthermore, it is noted that the coke selectivity of our present catalysts is substantially better than that of the prior art comparison catalysts. Certain compositions show also better gasoline selectivity than the reference catalyst (Sample 6).

EXAMPLE II

A. The sample of CaA zeolite used in the tests was a commercial product from Davison Chemical Co. It contained 18.1% Ca and had a surface area of 643 m²/g.

B. Various amounts of CaA as described above were compounded into catalyst using the technique set forth in Example I (C.) above. The RE-H-Y, matrix components and test conditions were the same as set forth in Example I.

The results are summarized in Table III below:

Table III

| Sample Type | Microactivity Data for RE-H-Y and CaA or H-Eric Mixtures | | | | |
|---|---|---|---|---|---|
| | RE-H-Y/CaA | RE-H-Y/CaA | RE-H-Y/ H-Erion. | RE-H-Y | CREY |
| Sample No. RE-H-Y/CaA mole ratio | 1 9:1 | 2 4:1 | 5 4:1 | 3 — | 4 — |
| Conversion, V% | 70 | 66 | 68 | 69 | 70 |
| $H_2$, W% | 0.03 | 0.03 | 0.03 | 0.05 | 0.03 |
| $C_3^-$, V% | 6.6 | 7.2 | 6.2 | 6.5 | 5.3 |
| $C_3$ tot., V% | 8.6 | 9.1 | 7.2 | 7.7 | 6.5 |
| $C_4^-$, V% | 4.7 | 4.6 | 2.7 | 4.4 | 6.5 |
| i-$C_4$, V% | 8.1 | 8.7 | 4.7 | 7.1 | 3.3 |
| $C_4$ tot, V% | 14.2 | 14.9 | 8.1 | 12.7 | 10.5 |
| $C_5^+$ gaso., V% | 57.2 | 53.0 | 60.2 | 56.8 | 58.9 |
| $C_4^+$ gaso., V% | 71.4 | 68.0 | 68.3 | 69.5 | 69.5 |
| C on cat, W% | 0.4 | 0.3 | 0.4 | 0.4 | 0.4 |
| C on feed, W% | 2.1 | 1.9 | 2.3 | 2.4 | 2.5 |
| $C_5^+$ gaso./conv., V/V | 0.82 | 0.80 | 0.89 | 0.82 | 0.85 |
| $C_5^+$ gaso./coke, V/W | 26.5 | 27.5 | 26.6 | 23.5 | 23.1 |
| Conv./coke, V/W | 32.3 | 34.3 | 30.0 | 28.7 | 27.1 |

From the above it is seen that the catalysts of the present invention possess superior $C_3$-$C_4$ hydrocarbon selectivity and low coke producing properties.

EXAMPLE IV

Another example of the advantage of using promoter mixtures over individual promoters is the use of a RE-H-Y/Erionite mixture as promoter in a cracking catalyst.

A. The RE-H-Y zeolite was prepared as described in Example I.

B. H-erionite was obtained from natural erionite by treating the crushed mineral with diluted hydrochloric acid under boiling, for about 3 hours. The resulting material had a surface area of 360 m²/g and a $SiO_2/Al_2O_3$ ratio of 21.

C. Various amounts of H-erionite were compounded into the catalyst containing RE-H-Y, as described in Example I. The matrix and test conditions are the same as those described in previous examples. The microactivity data obtained for a RE-H-Y/H-erionite (4:1) mixture are shown in Table III (Sample 5).

The data obtained indicates that under the test conditions described, RE-H-Y/H-erionite-promoted catalyst provide high activity and an improved gasoline and coke selectivity over RE-H-Y or CREY promoted catalysts.

What is claimed is:

1. A method for the catalytic cracking of hydrocarbons which comprises contacting a hydrocarbon feedstock with a catalyst comprising
   a. rare earth-hydrogen type Y zeolite,
   b. a second zeolite consisting of exchanged mordenite having the general formula M-mordenite wherein M is selected from the group consisting of hydrogen, rare earth, cobalt, nickel and group II cations, under catalytic cracking conditions and recovering the products formed thereby.

2. The method according to claim 1 wherein the cracking conditions comprise a temperature of 700°–1200°F, a catalyst oil ratio of 0.5 to 30 and a contact time of 0.5 seconds to 10 minutes.

3. The method according to claim 1 wherein the cracking conditions comprise a temperature 800°–1050°F, a catalyst to oil ratio of 3–8 and a contact time of 10 seconds to 5 minutes.

4. The method according to claim 1 wherein the feedstock is a gas oil boiling between 400° and 1050°F.

5. The process according to claim 1 wherein the catalyst is a blend of about 5 to 15 weight percent of the zeolitic component and about 95 to 85 weight percent of an amorphous silica alumina component.

* * * * *